US012596015B2

(12) United States Patent
Baus et al.

(10) Patent No.: US 12,596,015 B2
(45) Date of Patent: Apr. 7, 2026

(54) METHOD FOR CREATING A MAP REPRESENTATION OF A ROAD TRAFFIC NETWORK FOR NAVIGATION OF A VEHICLE

(71) Applicant: Robert Bosch GmbH, Stuttgart (DE)

(72) Inventors: Michael Baus, Bietigheim-Bissingen (DE); Carsten Hasberg, Ilsfeld-Auenstein (DE); Daniel Zaum, Sarstedt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 161 days.

(21) Appl. No.: 18/497,540

(22) Filed: Oct. 30, 2023

(65) Prior Publication Data

US 2024/0175711 A1 May 30, 2024

(30) Foreign Application Priority Data

Nov. 28, 2022    (DE) ..................... 10 2022 212 695.5

(51) Int. Cl.
*G01C 21/00* (2006.01)
*G08G 1/01* (2006.01)

(52) U.S. Cl.
CPC ....... *G01C 21/3848* (2020.08); *G08G 1/0112* (2013.01)

(58) Field of Classification Search
CPC ............... G01C 21/3848; G01C 21/30; G01C 21/3822; G01C 21/3841; G01C 21/32;

G01C 21/3852; G01C 21/3837; G01C 21/3815; G08G 1/0112; G05D 1/0088; G06V 20/588; B60W 40/06
See application file for complete search history.

(56) References Cited

U.S. PATENT DOCUMENTS

| | | | |
|---|---|---|---|
| 9,651,388 B1 * | 5/2017 | Chapman | ........... G01C 21/3848 |
| 11,079,492 B1 * | 8/2021 | Stumm | .............. G01C 21/3833 |
| 11,466,988 B2 * | 10/2022 | Li | ........................ G05D 1/0246 |

(Continued)

FOREIGN PATENT DOCUMENTS

| | | |
|---|---|---|
| DE | 102014015073 A1 | 4/2016 |
| DE | 102017210070 A1 | 12/2018 |

(Continued)

*Primary Examiner* — Hitesh Patel
(74) *Attorney, Agent, or Firm* — NORTON ROSE FULBRIGHT US LLP

(57) ABSTRACT

A method for creating a map representation of a road traffic network for navigation of a vehicle. The method includes: receiving environment sensor data from environment sensors of a plurality of vehicles of a vehicle fleet, using an external computing unit; carrying out a SLAM method on the received environment sensor data and ascertaining a SLAM map representation of the road traffic network traveled by the vehicles, using the external computing unit; receiving differential positioning data of a differential global positioning system of at least one vehicle of the vehicle fleet, using the external computing unit; integrating a pose information item of the positioning data into the map representation, relating to at least one pose of the vehicle on a road of the road traffic network, and creating a map representation enriched with the pose information item, using the external computing unit.

10 Claims, 2 Drawing Sheets

(56) References Cited

U.S. PATENT DOCUMENTS

| | | | | |
|---|---|---|---|---|
| 2017/0307763 A1* | 10/2017 | Browning | ............... | G01S 19/07 |
| 2021/0025713 A1* | 1/2021 | Ma | ..................... | G01C 21/1656 |
| 2025/0347532 A1* | 11/2025 | Ali | ........................... | G01C 7/04 |

FOREIGN PATENT DOCUMENTS

| | | | |
|---|---|---|---|
| DE | 102020103906 A1 | 8/2021 |
| EP | 3617749 A1 | 3/2020 |

* cited by examiner

METHOD FOR CREATING A MAP REPRESENTATION OF A ROAD TRAFFIC NETWORK FOR NAVIGATION OF A VEHICLE

CROSS REFERENCE

The present application claims the benefit under 35 U.S.C. § 119 of German Patent Application No. DE 10 2022 212 695.5 filed on Nov. 28, 2022, which is expressly incorporated herein by reference in its entirety.

FIELD

The present invention relates to a method for creating a map representation of a road traffic network for navigation of a vehicle.

BACKGROUND INFORMATION

Methods for creating map representations of road traffic networks for navigation of vehicles are available in the related art.

It is an object of the present invention to provide an improved method for creating a map representation of a road traffic network for navigation of a vehicle.

SUMMARY

This object may be achieved by the method for creating a map representation of a road traffic network for navigation of a vehicle according to features of the present invention. Advantageous embodiments of the present invention are disclosed herein.

According to one aspect of the present invention, a method for creating a map representation of a road traffic network for navigation of a vehicle is provided. According to an example embodiment of the present invention, the method includes: receiving environment sensor data from environment sensors of a plurality of vehicles of a vehicle fleet, by means of an external computing unit, wherein the environment sensor data reproduce roads of the road traffic network traveled by each of the vehicles; carrying out a SLAM method on the received environment sensor data and ascertaining a SLAM map representation of the road traffic network traveled by the vehicles, by means of the external computing unit; receiving differential positioning data of a differential global positioning system of at least one vehicle of the vehicle fleet, by means of the external computing unit; integrating a pose information item of the positioning data into the map representation, relating to at least one pose of the vehicle on a road of the road traffic network, and creating a map representation enriched with the pose information item, by means of the external computing unit, wherein the pose information item comprises at least a position information item and/or an orientation information item of the vehicle; and providing the enriched map representation to at least one vehicle of the vehicle fleet, by means of the external computing unit.

A technical advantage can thereby be achieved that an improved method for creating a map representation of a road traffic network for navigation of a vehicle can be provided. For this purpose, fleet data of a vehicle fleet are first received from vehicles, wherein the fleet data in this case comprise environment sensor data from environment sensors of the vehicles. The environment sensor data reproduce the surroundings of the different vehicles as they travel along individual roads of the road traffic network to be reproduced. On the basis of the received environment sensor data, a SLAM method is carried out, and a SLAM map representation of the road traffic network to be reproduced is generated. For this purpose, SLAM methods from the related art can be used, by means of which a map representation of the road traffic network to be reproduced can be generated on the basis of the received environment sensor data. Within the meaning of the application, SLAM stands for Simultaneous Localization And Mapping.

According to an example embodiment of the present invention, in addition to the environment sensor data, differential positioning data of a differential global positioning system are received, which are provided at least by a vehicle of the vehicle fleet. On the basis of the differential positioning data, a pose information item relating to a pose of the vehicle is then ascertained and integrated into the SLAM map representation. The map representation thus enriched can then be provided to the vehicles of the vehicle fleet for navigation. By integrating the pose information item of the positioning data of the differential global positioning system, the precision of the SLAM map representation can be increased. The differential positioning data of the differential global positioning system enable a high-precision pose information item of the relevant vehicle providing the positioning data. The pose information here comprises position information and/or orientation information. By integrating the position or orientation information into the SLAM map representation, the relative positioning information of the SLAM map representation can be converted into absolute positioning information. This can be improved in particular thanks to the high precision of the positioning data of the differential global positioning system, which enables positioning determination with errors in the centimeter range.

According to one example embodiment of the present invention, the integration of the pose information item comprises: ascertaining a SLAM pose information item, corresponding to the pose information item of the positioning data, of the SLAM map representation, by means of the external computing unit, wherein the SLAM pose information item comprises a position information item and/or an orientation information item; and integrating the pose information item of the positioning data into the SLAM map representation as an additional information item to the corresponding SLAM pose information item.

A technical advantage can thereby be achieved that the precision of the map representation can be further increased by integrating the pose information item into the map representation.

According to one example embodiment of the present invention, the integration of the pose information item comprises:

ascertaining the SLAM pose information item, corresponding to the pose information item of the positioning data, of the SLAM map representation, by means of the external computing unit, wherein the SLAM pose information item comprises a position information item and/or an orientation information item;

ascertaining a pose difference value between the pose information item of the positioning data and the SLAM pose information item; and integrating the pose difference value into the SLAM map representation, wherein the pose difference value comprises a position difference value between the position value of the pose information item and the position value of the SLAM pose information item and/or an orientation difference value between the orientation value of the pose information item and the orientation value of the SLAM pose information item.

A technical advantage can thereby be achieved that, by taking into account the pose difference value, a deviation of the position information item or orientation information item from the SLAM map representation from the position information item or orientation information item of the differential positioning data can be provided. As a result, the positioning information of the SLAM map representation can be corrected by the deviation value in the form of the pose difference value. The precision of the map representation can thereby be further increased.

According to one example embodiment of the present invention, the integration of the pose information item comprises: correcting the SLAM pose information item by the pose difference value, and generating a corrected SLAM pose information item of the enriched map representation, wherein the correction comprises correcting the position value and/or the orientation value.

As a result, a technical advantage can be achieved that a further increase in the precision of the map representation can be effected by correcting the SLAM pose information item by the pose difference value.

According to one example embodiment of the present invention, the pose information item is in the form of an average value of a plurality of pose information items of a plurality of positioning data of a plurality of vehicles.

As a result, a technical advantage can be achieved that a further precision of the pose information item of the differential positioning data and thus a further increase in the precision of the map representation can be effected by means of the averaging.

According to one example embodiment of the present invention, the integration of the pose information item is carried out for a predefined distance between successive poses of the map representation.

A technical advantage can thereby be achieved that a corresponding correction by the pose difference value can be calculated for different poses within the map representation, and the entire map representation can thus be made more precise.

According to one example embodiment of the present invention, the differential position data of the differential global positioning system are based on corrected propagation time information of satellite signals of the global positioning system, wherein the corrected propagation time information is corrected in relation to propagation time information of predefined reference signals.

A technical advantage can thereby be achieved that, by taking into account the predefined reference signals, the differential positioning data of the differential global positioning system have a high precision and, in particular, are independent of weather-related influences on the propagation time information of the satellite signals.

According to one example embodiment, the environment sensor data comprise camera data and/or lidar data and/or radar data.

A technical advantage can thereby be achieved that a precise reproduction of the traffic network to be reproduced is made possible by the environment sensor data.

According to a further aspect of the present invention, a computing unit is provided, which is configured to carry out the method for creating a map representation of a road traffic network for navigation of a vehicle according to any of the above-described embodiments.

According to a further aspect of the present invention, a computer program product is provided, comprising commands that, when the program is executed by a data processing unit, cause this data processing unit to carry out the method for creating a map representation of a road traffic network for navigation of a vehicle according to any of the above-described embodiments.

Exemplary embodiments of the present invention are explained with reference to the figures.

DETAILED DESCRIPTION OF EXAMPLE EMBODIMENTS

Figure 1:
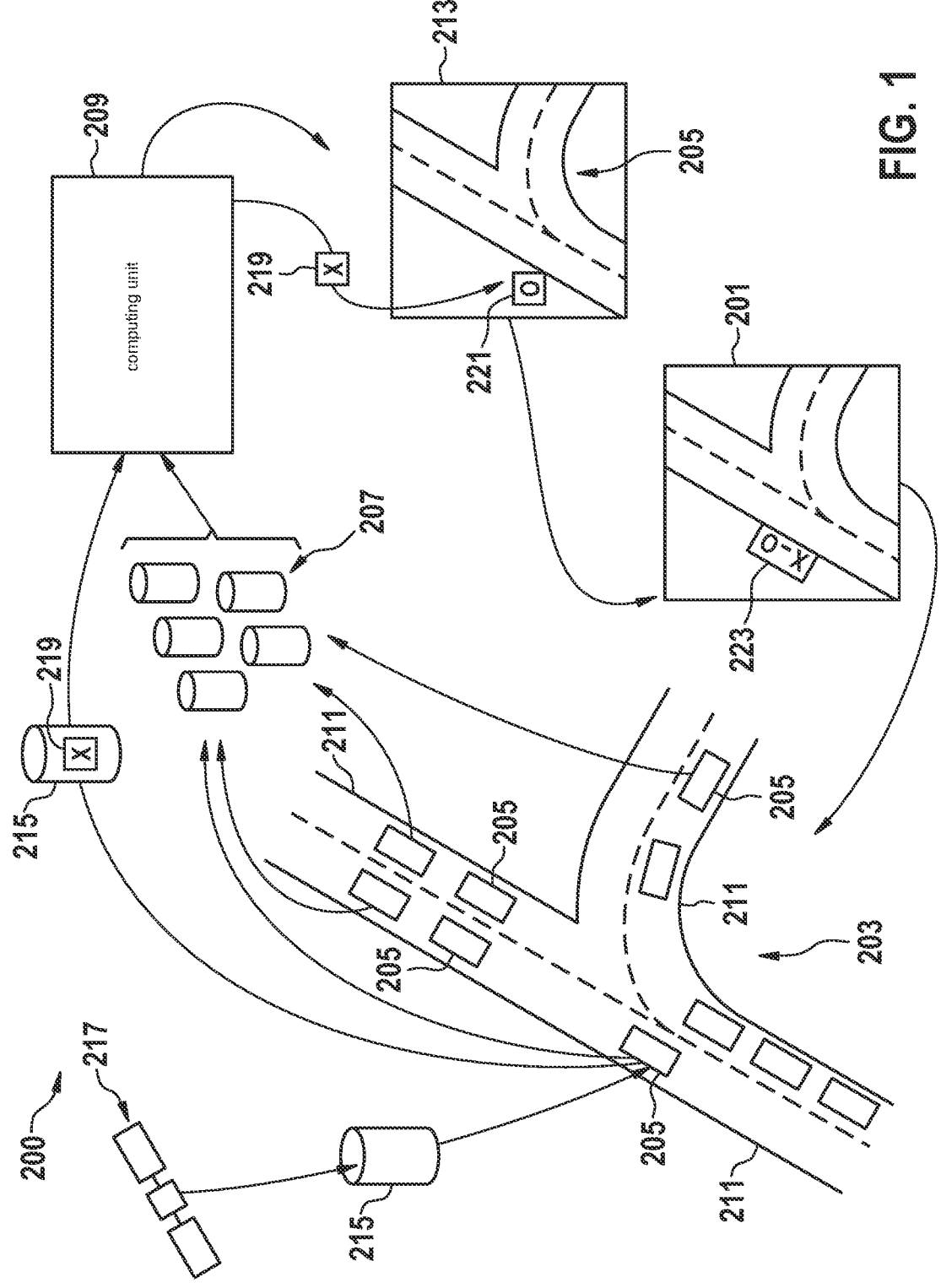
FIG. 1 shows a schematic representation of a system for creating a map representation of a road traffic network for navigation of a vehicle according to an example embodiment of the present invention.

FIG. 1 shows a schematic representation of a system 200 for creating a map representation 201 of a road traffic network 203 for navigation of a vehicle 205 according to an embodiment.

FIG. 1 shows a vehicle fleet having a plurality of vehicles 205, which travel along a plurality of roads 211 of a road traffic network 203. The vehicles 205 are each designed with environment sensors and configured to receive corresponding environment sensor data 207. The environment sensor data 207 are configured to reproduce the corresponding surroundings of a vehicle 205. The environment sensors can be, for example, camera sensors, lidar sensors or radar sensors.

According to the present invention, the system 200 comprises an external computing unit 209. The external computing unit 209 is configured to carry out the method according to the present invention for creating a map representation of the road traffic network 203. The external computing unit 209 can be designed, for example, as an external server architecture.

For this purpose, the vehicles 205 of the vehicle fleet transmit the environment sensor data 207, each received while driving along the roads 211 of the road traffic network 203, to the external computing unit 209.

Thereupon, the external computing unit 209 is configured to carry out a SLAM method (Simultaneous Location And Mapping) on the basis of the environment sensor data 207 of the vehicle fleet and thus to create a SLAM map representation 213 of the road traffic network 203 on the basis of the environment sensor data 207.

Via the SLAM method, SLAM pose information items 221 are also integrated into the SLAM map representation 213. These SLAM pose information items 221 describe position information items and/or orientation information items of individual objects within the SLAM map representation 213. These objects can be provided, for example, by landmarks or characteristic objects in the surroundings of the traffic network 203, for which positioning values or orientation values can be ascertained by means of the SLAM method.

According to the present invention, at least one vehicle 205 of the vehicle fleet is configured to receive differential positioning data 215 of a differential global positioning system (differential GPS) and to use them for vehicle navigation.

The differential positioning data 215 of the differential global positioning system 217 are characterized in that the propagation time information of the satellite data of the differential global positioning system 217 is corrected to reference values. For this purpose, the differential global positioning system 217 comprises stationary reference measuring stations, which are not shown in FIG. 1. The global position values are known for the stationary reference measuring stations. By comparing the known global position values with the position values of the differential global positioning system 217 that were ascertained on the basis of the satellite signals received by the stationary reference measuring stations, a deviation of the position values determined on the basis of the satellite signals of the differential global positioning system 217 can be ascertained with the previously known position values of the stationary reference measuring stations. In this way, propagation time differences of the satellite signals between the transceiver units of the stationary reference measuring stations and the respective satellites of the differential global positioning system 217, which are based on weather- and/or climate-related properties of the atmospheric layers, can be ascertained. The differential positioning data 215 received by the relevant vehicle 205 are therefore corrected according to the propagation time deviations of the satellite signals determined by the stationary reference measuring stations, whereby an increased precision of the positioning data 215 is achieved.

According to the present invention, the positioning data 215 comprise at least one pose information item 219. The pose information item 219 describes a pose of the vehicle 205 during the reception of the differential positioning data 215 of the differential global positioning system 217. The pose information items 219 comprise at least a position information item and/or an orientation information item of the vehicle 205 at said reception time.

According to the present invention, the external computing unit 209 receives the differential positioning data 215 provided by the relevant vehicle 205 with the pose information item 219 included.

According to the present invention, the pose information item 219 of the differential positioning data 215 is integrated into the SLAM map representation 213 in order to enrich same. The map representation 201 is thereby generated, which is based on the SLAM map representation 213 and was enriched by the pose information item 219 of the differential positioning data 215 of the at least one vehicle 205 of the vehicle fleet.

For this purpose, in the embodiment shown, a corrected SLAM pose information item 223 is stored in the map representation 201. The corrected SLAM pose information item 223 can be, for example, in the form of a difference value between the SLAM pose information item 221 and the pose information item 219 of the differential positioning data 215. Alternatively, the corrected SLAM pose information item 223 can be in the form of an already corrected value that was created by correcting the SLAM pose information item 221 by the pose difference value. For this purpose, a corresponding SLAM pose information item 221 of the SLAM map representation 213 can be ascertained for the at least one pose information item 219 of the differential positioning data 215. Subsequently, a corresponding pose difference value can be calculated as a difference between the two pose information items 219, 221. The further pose information items of the SLAM map representation 213 can subsequently be stored in the SLAM map representation 213 as a correction value by the calculated pose difference value. When the map representation 201 is used for navigation in a vehicle 205, the corresponding position values can be corrected according to the correction factor stored in the pose difference value.

In the event that the vehicle fleet comprises a plurality of vehicles 205 that are configured to receive the differential positioning data 215 of the differential global positioning system 217 and to provide same to the external computing unit 209, the pose information item 219 used for the enrichment of the SLAM map representation 213 can be calculated as an average value of the different pose information items 219 of the plurality of differential positioning data 215 of the plurality of vehicles 205 of the vehicle fleet.

According to the present invention, the map representation 201 correspondingly enriched by corrected SLAM pose information items 213 is provided by the external computing unit 209 to the vehicles 205 of the vehicle fleet for navigation. This can be done, for example, via a wireless data transmission, so that the vehicle fleet can be provided with the updated map representation having the corrected SLAM pose information item 223 while the vehicles 205 are traveling.

According to one embodiment, the map representation 201 can be enriched at a predetermined interval, for example every 5 to 10 meters, by a corresponding corrected SLAM pose information item 223. The individual roads of the road traffic network can thereby be provided with corresponding corrected SLAM pose information items 223 at predetermined intervals in the map representations 201.

Figure 2:
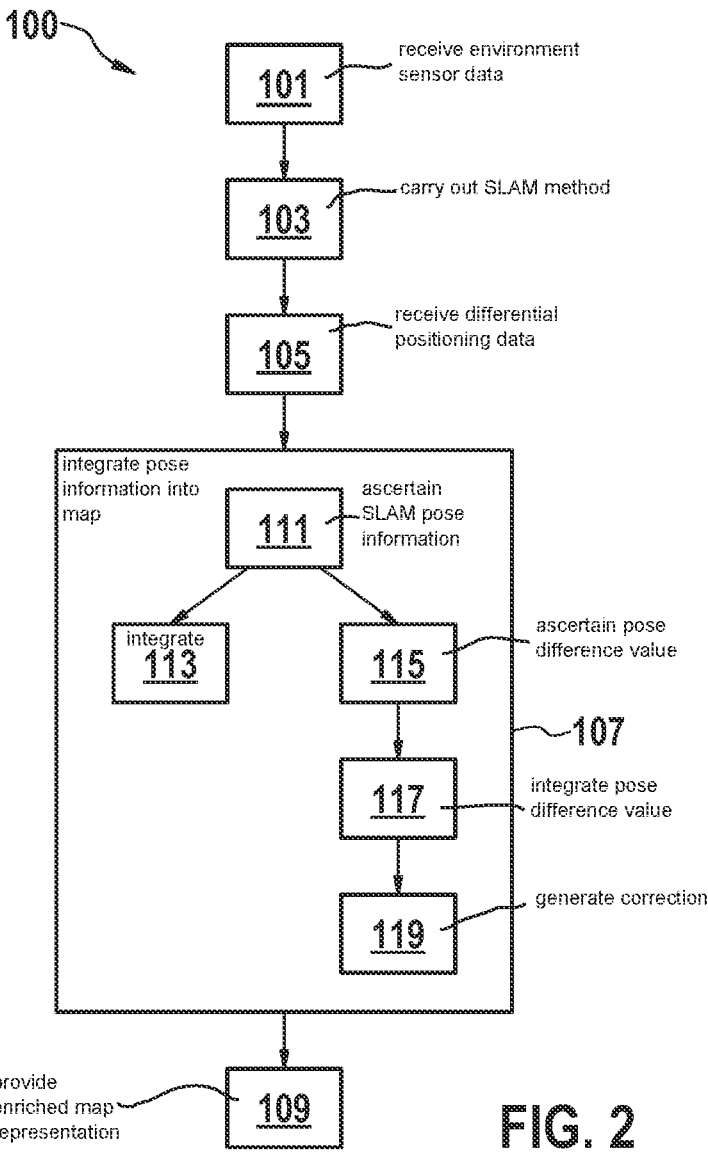
FIG. 2 shows a flowchart of a method for creating a map representation of a road traffic network for navigation of a vehicle according to an example embodiment of the present invention.

FIG. 2 shows a flowchart of a method 100 for creating a map representation 201 of a road traffic network 203 for navigation of a vehicle 205 according to an embodiment.

In a first method step 101, environment sensor data 207 from environment sensors of a plurality of vehicles 205 of a vehicle fleet are first received by the external computing unit 209.

In a further method step 103, a SLAM method is carried out on the received environment sensor data 207, and a corresponding SLAM map representation 213 of the road traffic network 203 traveled by the vehicles is ascertained.

In a further method step 105, differential positioning data 215 of a differential global positioning system 217 are received by the external computing unit 209, wherein these data are provided by at least one vehicle 205 of the vehicle fleet.

In a further method step 107, a pose information item 219 of the differential positioning data 215 is integrated into the map representation 201.

For this purpose, in a method step 111, a SLAM pose information item 221, corresponding to the pose information item 219 of the differential positioning data 215, of the SLAM map representation is first ascertained.

In a further method step 113, the pose information item 219 of the differential positioning data 215 is integrated as pose information into the SLAM map representation 213. In the process, the original SLAM pose information item 221 can be replaced by the pose information item 219 of the positioning data 215.

Alternatively, in a method step 115, a pose difference value can be ascertained between the pose information item 219 of the differential positioning data 215 and the SLAM pose information item 221.

In a further method step 117, the pose difference value can be integrated into the SLAM map representation 213. In this case, the correspondingly calculated pose difference value is received additionally to the SLAM pose information item 221 already listed in the SLAM map representation 213 and is used as a deviation of the SLAM pose information item 221 from the pose information item 219 of the differential positioning data 215.

In a further method step 119, a correction of the SLAM pose information item 221 by the correspondingly calculated pose difference value can also be carried out, and a corrected SLAM pose information item 223 can be generated.

The enrichment of the SLAM map representation 213 by the pose information item 219 of the positioning data 215 or the correction of the SLAM pose information item 221 by the pose difference value can be performed for a predefined distance, for example every 5 to 10 meters.

In a further method step 109, the enriched map representation 201 is provided to the vehicles 205 of the vehicle fleet by the external computing unit 209.

Figure 3:
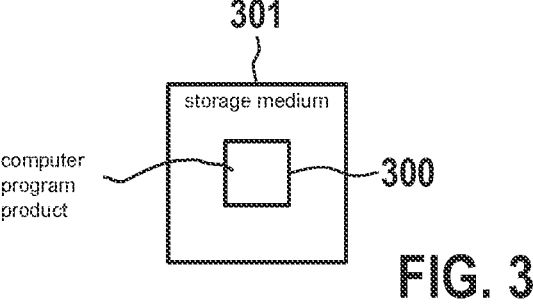
FIG. 3 shows a schematic representation of a computer program product, according to an example embodiment of the present invention.

FIG. 3 shows a schematic representation of a computer program product 300, comprising commands that, when the program is executed by a data processing unit, cause this data processing unit to carry out the method 100 for creating a map representation of a road traffic network for navigation of a vehicle.

In the embodiment shown, the computer program product 300 is stored on a storage medium 301. The storage medium 301 can be any storage medium from the related art.

What is claimed is:

1. A method for creating a map representation of a road traffic network for navigation of one or more vehicles forming a vehicle fleet, the method comprising the following steps:

continually repeating the following set of steps:

receiving environment sensor data from environment sensors of a plurality of vehicles of the vehicle fleet, using an external computing unit, wherein the environment sensor data reproduce roads of the road traffic network traveled by each of the plurality of vehicles;

carrying out a simultaneous localization and mapping (SLAM) method on the received environment sensor data and ascertaining a SLAM map representation of the road traffic network traveled by the plurality of vehicles, using the external computing unit, the SLAM map representation including features mapped based on the environment sensor data;

receiving differential positioning data of a differential global positioning system (DGPS) of the plurality of vehicles of the vehicle fleet, using the external computing unit;

correlating the received DGPS data of the plurality of vehicles to one another and to features mapped based on the environment sensor data, using the external computing unit;

for each of two or more of the plurality of vehicles, determining a respective pose difference between (i) a SLAM pose corresponding to a respective one of the mapped features of the SLAM map representation and (ii) a pose derived from the DGPS data for the respective vehicle;

averaging, using the external computing unit, the respective pose differences determined for the two or more of the plurality of vehicles to obtain an averaged pose correction; and modifying, using the external computing unit, one or more of the mapped features of the SLAM map representation based on the averaged pose correction, thereby generating an enriched map representation, wherein the modifying includes shifting a location of a mapped road segment in the SLAM map representation based on the averaged pose correction, and wherein the continual repetition dynamically updates the enriched map representation over time; and continually providing the updated enriched map representation to one or more vehicles of the vehicle fleet, using the external computing unit, thereby influencing a navigation of the one or more vehicles of the vehicle fleet.

2. The method according to claim 1, wherein the repetition is carried out for a predefined distance between successive poses of the map representation.

3. The method according to claim 1, wherein the differential position data of the differential global positioning system are based on corrected propagation time information of satellite signals of the global positioning system, and wherein the corrected propagation time information is corrected in relation to propagation time information of predefined reference signals.

4. The method according to claim 1, wherein the environment sensor data include: camera data and/or lidar data and/or radar data.

5. A computing unit configured to create a map representation of a road traffic network for navigation of one or more vehicles forming a vehicle fleet, the computing unit comprising a processor that is programmed to:

continually repeat the following set of steps:

receive environment sensor data from environment sensors of a plurality of vehicles of the vehicle fleet, using an external computing unit, wherein the environment sensor data reproduce roads of the road traffic network traveled by each of the plurality of vehicles;

carry out a simultaneous localization and mapping (SLAM) method on the received environment sensor data and ascertain a SLAM map representation of the road traffic network traveled by the plurality of vehicles, using the external computing unit, the SLAM map representation including features mapped based on the environment sensor data;

receive differential positioning data of a differential global positioning system (DGPS) of the plurality of vehicles of the vehicle fleet, using the external computing unit;

correlate the received DGPS data of the plurality of vehicles to one another and to features mapped based on the environment sensor data, using the external computing unit;

for each of two or more of the plurality of vehicles, determining a respective pose difference between (i) a SLAM pose corresponding to a respective one of the mapped features of the SLAM map representation and (ii) a pose derived from the DGPS data for the respective vehicle;

average, using the external computing unit, the respective pose differences determined for the two or more of the plurality of vehicles to obtain an averaged pose correction; and modify, using the external computing unit, one or more of the mapped features of the SLAM map representation based on the averaged pose correction, thereby generating an enriched map representation, wherein the modification includes a shift of a location of a mapped road segment in the SLAM map representation based on the averaged pose correction, and wherein the continual repetition dynamically updates the enriched map representation over time; and continually provide the updated enriched map representation to one or more vehicles of the vehicle fleet, using the external computing unit, thereby influencing a navigation of the one or more vehicles of the vehicle fleet.

6. A non-transitory computer-readable medium on which is stored a computer program including commands for creating a map representation of a road traffic network for navigation of one or more vehicles forming a vehicle fleet, the commands, when executed by a data processor, causing the data processor to perform the following steps:

continually repeating the following set of steps:

receiving environment sensor data from environment sensors of a plurality of vehicles of the vehicle fleet, using an external computing unit, wherein the environment sensor data reproduce roads of the road traffic network traveled by each of the plurality of vehicles;

carrying out a simultaneous localization and mapping (SLAM) method on the received environment sensor data and ascertaining a SLAM map representation of the road traffic network traveled by the plurality of vehicles, using the external computing unit, the SLAM map representation including features mapped based on the environment sensor data;

receiving differential positioning data of a differential global positioning system (DGPS) of the plurality of vehicles of the vehicle fleet, using the external computing unit;

correlating the received DGPS data of the plurality of vehicles to one another and to features mapped based on the environment sensor data, using the external computing unit;

for each of two or more of the plurality of vehicles, determining a respective pose difference between (i) a SLAM pose corresponding to a respective one of the mapped features of the SLAM map representation and (ii) a pose derived from the DGPS data for the respective vehicle;

averaging, using the external computing unit, the respective pose differences determined for the two or more of the plurality of vehicles to obtain an averaged pose correction; and modifying, using the external computing unit, one or more of the mapped features of the SLAM map representation based on the averaged pose correction, thereby generating an enriched map representation, wherein the modifying includes shifting a location of a mapped road segment in the SLAM map representation based on the averaged pose correction, and wherein the continual repetition dynamically updates the enriched map representation over time; and continually providing the updated enriched map representation to one or more vehicles of the vehicle fleet, using the external computing unit, thereby influencing a navigation of the one or more vehicles of the vehicle fleet.

7. The method according to claim 1, wherein the respective pose difference determined for each of the two or more of the plurality of vehicles includes a position difference and/or an orientation difference between the SLAM pose and the pose derived from the DGPS data.

8. The method according to claim 1, wherein the respective pose difference determined for each of the two or more of the plurality of vehicles includes a lateral difference and/or a longitudinal difference between the SLAM pose and the pose derived from the DGPS data.

9. The method according to claim 1, wherein the averaging is weighted based on an accuracy value associated with the DGPS data of each of the vehicles of the plurality of vehicles.

10. The method according to claim 1, wherein the correlating includes identifying features of the road traffic network that are commonly traveled by two or more of the plurality of vehicles.

* * * * *